(No Model.)

T. E. JONES.
PLOW.

No. 338,844. Patented Mar. 30, 1886.

WITNESSES:
Chas. Nida.
C. Sedgwick.

INVENTOR:
T. E. Jones
BY Munn & Co
ATTORNEYS.

UNITED STATES PATENT OFFICE.

THOMAS ELI JONES, OF CENTRE STAR, ALABAMA.

PLOW.

SPECIFICATION forming part of Letters Patent No. 338,844, dated March 30, 1886.

Application filed December 9, 1885. Serial No. 185,139. (No model.)

*To all whom it may concern:*

Be it known that I, THOMAS ELI JONES, of Centre Star, Lauderdale county, and State of Alabama, have invented a new and useful Improvement in Plows, of which the following is a full, clear, and exact description.

Reference is to be had to the accompanying drawings, forming a part of this specification, in which similar letters of reference indicate corresponding parts in all the figures.

Figure 1:
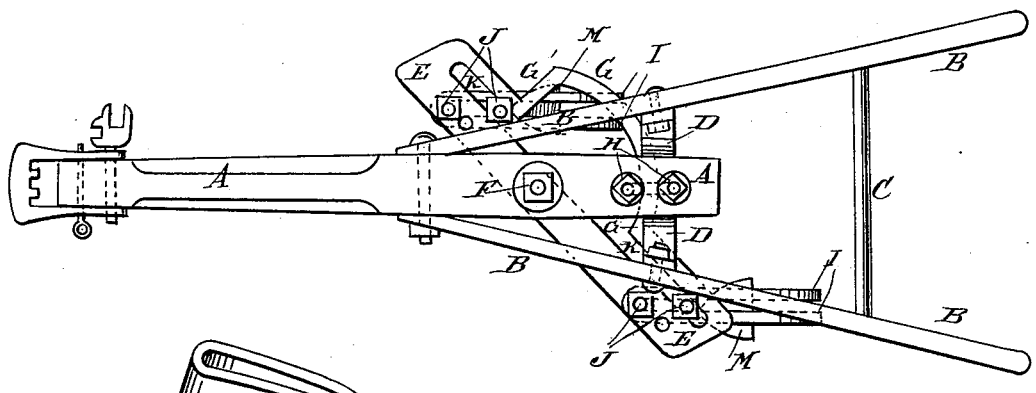
Figure 3:
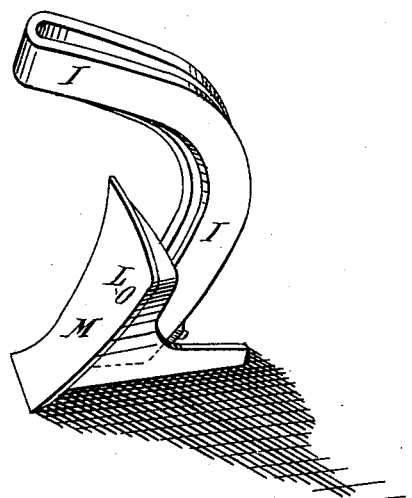
Figure 2:
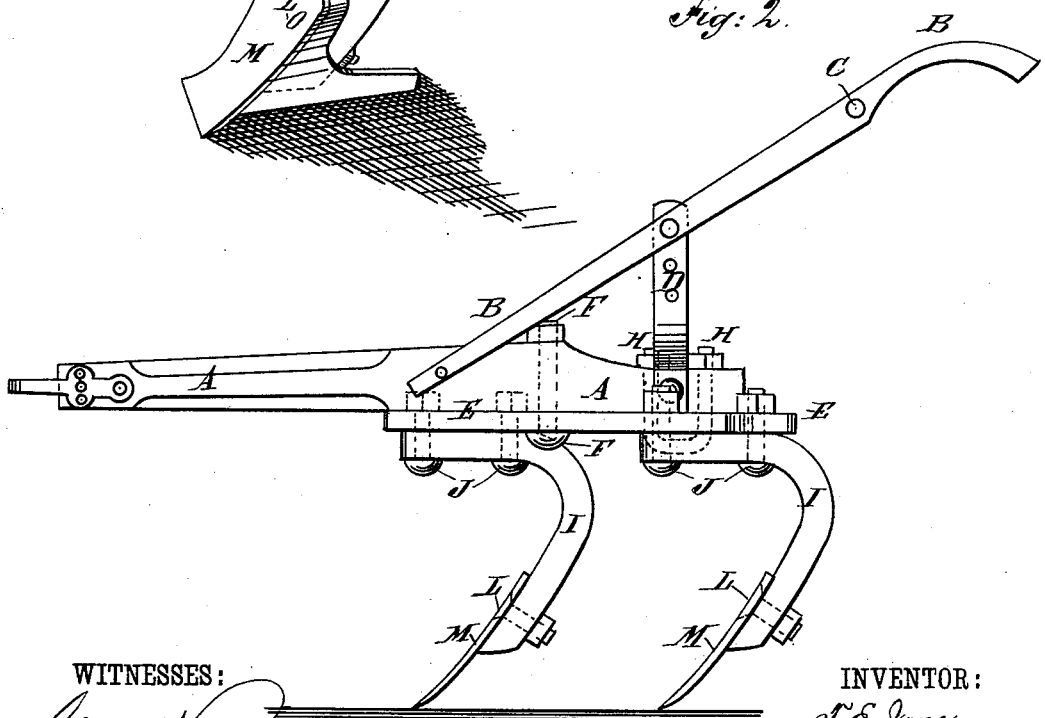

Figure 1 is a plan view of my improved plow. Fig. 2 is a side elevation of the same. Fig. 3 is a perspective view of a plow-standard provided with a turn-plow.

The object of this invention is to provide plows constructed in such a manner that they can be readily adjusted for use in the various operations of preparing the ground and cultivating the crop.

The invention consists in the construction and combination of various parts of the plow, as will be hereinafter fully described.

A represents the plow-beam, to the opposite sides of the middle part of which are secured the forward ends of the handles B. The handles B are held at the proper distance apart by a round, C, attached to them, and are held at the desired elevation by braces D, attached to them and to the rear end of the beam A.

E is a cross-bar, which is secured at its center to the beam A, at a little distance from its rear end, by a bolt, F. Upon the rear edge of the cross-bar E is formed a bar, G, which is curved in the arc of a circle having its center at the bolt F, and has a square shoulder, G', at one end, as shown in Fig. 1. Around the bar G is passed the bend of a U-shaped bolt, H, which passes up through the rear end of the beam A, and has nuts screwed upon its ends. With this construction, by loosening the nuts of the bolts F H the cross-bar E can be adjusted at right angles with the beam A, or at any desired angle with the said beam as the work to be done may require, and can be firmly secured in place when adjusted by tightening the said nuts.

I are the plow-standards, the upper parts of which are horizontal, to fit against the lower side of the end parts of the cross-bar E. Each standard I is secured to the cross-bar E by two bolts, J, the rear one of which passes through a longitudinal slot, K, in the said cross-bar E, so that the said standard can be adjusted parallel with the line of draft, however the said cross-bar E may be adjusted. The standards I are slotted longitudinally, to receive the bolts J, that fasten them to the cross-bar E, and the bolts L, that fasten the plow M to their lower ends. The plows M may be shovel-plows, as shown in Fig. 2, turn-plows, as shown in Fig. 3, scrapers, or any other kind of plow, as the work to be done may require. When a single plow is required, the cross-bar E can be detached and a plow-standard, I, secured directly to the lower side of the beam A. With this construction, by adjusting the cross-bar E and using suitable plows, M, the plow can be used for the several operations necessary in preparing the ground and cultivating the crop. By detaching the standards I and removing the bolts F H, the slotted cross-bar E can be be removed, turned over, turned end for end, and the said cross-bar and the plow-standards can then be again secured in place, thus reversing the plows and adapting the cultivator to work on the other side of the row of plants. This adjustment will be advantageous when using diamond harrow-tooth or scooter plows.

Having thus fully described my invention, I claim as new and desire to secure by Letters Patent—

The combination, with the plow-beam, of the cross-bar centrally pivoted to the beam and having slots, and the rear curved bar connected by a U-shaped bolt to the beam, and the curved slotted standards connected to said cross-bar by pivot-bolts and by adjusting-bolts passed through the slots of said standards and cross-bar, substantially as and for the purpose set forth.

THOMAS ELI JONES.

Witnesses:
F. E. FAUTON,
O. P. JOHNSON.